United States Patent [19]

Mach et al.

[11] 3,904,642
[45] Sept. 9, 1975

[54] BENZIMIDAZOLYL COUMARINE FLUORESCENT DYES

[75] Inventors: Wolfgang Mach, Hockenheim; Horst Scheuermann, Ludwigshafen, both of Germany

[73] Assignee: Badische Anilin- & Soda-Fabrik Aktiengesellschaft, Ludwigshafen (Rhine), Germany

[22] Filed: Sept. 5, 1972

[21] Appl. No.: 286,416

[30] Foreign Application Priority Data
Sept. 7, 1971 Germany............................ 2144591

[52] U.S. Cl................ 260/309.2; 8/54.2; 8/177 R; 8/178 R; 8/179; 260/247.2 A; 260/247.2 B; 260/247.5 H; 260/247.7 G; 260/256.4 Q; 260/268 BC; 260/294.8 A; 260/294.9; 260/293.58; 260/304; 260/326.34; 260/326.5 D; 260/332.2 A; 260/332.2 C; 260/332.3 P; 260/345.2
[51] Int. Cl.²....................................... C07D 235/18
[58] Field of Search............ 260/309.2, 294.9, 345.2

[56] References Cited
UNITED STATES PATENTS
3,539,583  11/1970  Voltz et al. ...................... 260/294.9
3,681,397  8/1972  Knupfer et al. .................. 260/309.2
3,766,199  10/1973  Dehnert et al. .................. 260/309.2

FOREIGN PATENTS OR APPLICATIONS
452,474  5/1968  Switzerland..................... 260/309.2

Primary Examiner—Henry R. Jiles
Assistant Examiner—S. D. Winters
Attorney, Agent, or Firm—Johnston, Keil, Thompson & Shurtleff

[57] ABSTRACT

Dyes of the formula:

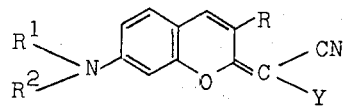

obtained from the corresponding 2-iminocoumarines by reaction with a compound of the formula:

The dyes give brilliant yellow to red shades on textile material, particularly polyesters and acrylonitrile polymers.

9 Claims, No Drawings

BENZIMIDAZOLYL COUMARINE FLUORESCENT DYES

The invention relates to dyes of the formula (I):

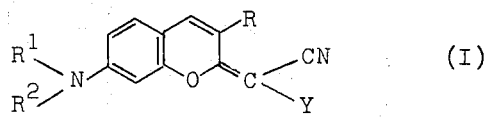

in which

R¹ is hydrogen, alkyl of one to four carbon atoms, alkyl of one to four carbon atoms bearing alkoxy, chlorine, bromine, carboxyl, carbalkoxy, carbamoyl or acetoxy as a substituent, cyclohexyl, benzyl or phenyl;

R² is hydrogen, alkyl of one to four carbon atoms, or alkyl of one to four carbon atoms bearing alkoxy, chlorine, bromine, carboxyl, carbalkoxy, carbamoyl or acetoxy as a substituent;

R¹ and R² together with the adjacent nitrogen are the radical of a five-membered or six-membered heterocyclic ring; Y is carbalkoxy, unsubstituted or substituted carbamoyl or cyano; R is a radical of the formula:

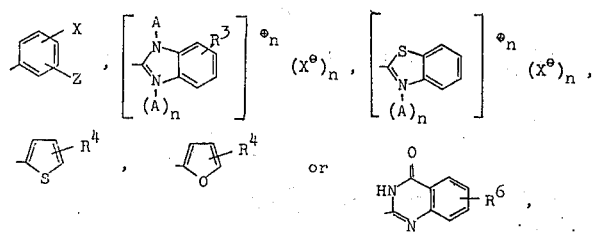

X is cyano or nitro;

Z is hydrogen, cyano, chlorine, bromine, methylsulfonyl, ethylsulfonyl, sulfonamido or nitro;

A is hydrogen, methyl, ethyl, β-hydroxyethyl or β-hydroxypropyl;

R³ is hydrogen or methyl;

R⁴ is hydrogen, carbalkoxy, unsubstituted or substituted carbamoyl or cyano;

R⁶ is hydrogen, methyl, ethyl, chlorine, methoxy or ethoxy;

$n$ is zero or 1; and

X⁻ is an anion.

The following are examples of substituents in addition to those already specified:

For R¹ and R²:
methyl, ethyl, n-propyl, isopropyl, n-butyl, isobutyl, β-methoxyethyl, β-ethoxyethyl, β-acetoxyethyl, β-chloroethyl, β-carbomethoxyethyl, β-carboethoxyethyl, β-carbobutoxyethyl, β-methoxypropyl, β-ethoxypropyl, β-methoxy-γ-chloropropyl or β-acetoxypropyl.

R¹ and R² together with the adjacent nitrogen may be for example the radical of pyrrolidine, piperidine, morpholine, piperazine or N-methylpiperazine.

Examples of specific radicals Y are: carbomethoxy, carboethoxy, carbobutoxy, carbamoyl, N-alkylcarbamoyl or N,N-dialkylcarbamoyl such as diethylcarbamoyl, ethylcarbamoyl, butylcarbamoyl, isooctylcarbamoyl, methylcarbamoyl, dimethylcarbamoyl, dipropylcarbamoyl, dibutylcarbamoyl or N-methyl-N-butylcarbamoyl, carboxanilide, cyclohexylcarbamoyl, benzylcarbamoyl, carboxypyrrolidide, carboxypiperidide, carboxymorpholide, carboxypiperazide and carboxy-N-methylpiperazide.

Cyano is preferred for Y.

The same carbalkoxy and carbamoyl radicals as specified for y may be used for R⁴.

Examples of anions X⁻ are chloride, sulfate, methosulfate, ethosulfate, acetate, p-toluenesulfonate, tetrachlorizincate and tetrafluoborate.

Dyes of formula (Ia):

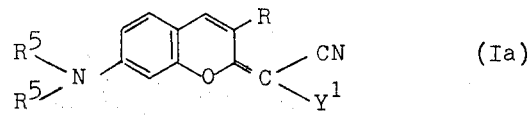

in which

Y¹ is cyano or carbamoyl;

R⁵ is alkyl of one to four carbon atoms, preferably methyl or ethyl; and R has the meanings given above are of particular industrial significance.

R is preferably phenyl, benzimidazolyl, 3,4-dihydro-4-oxoquinazolyl or thenyl and may also be quaternized benzimidazolyl.

The new dyes have high brilliance, the shade lying within the range from yellow to violet. They are suitable for dyeing polyamide, cellulose ester, acrylonitrile polymer and polyester textile materials.

Compounds of formula (I) may be prepared by reacting an iminocoumarine of formula (II)

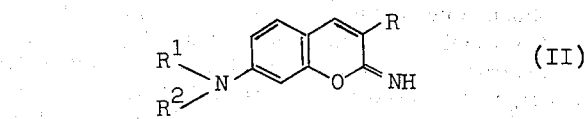

with a compound of formula (III):

and if desired quaternizing the reaction product. R, R¹, R² and Y have the meanings given above. Iminocoumarines of formula (II) are known from German Pat. application P, 21,29,565.8 and from German Laid-Open Specification No. 1,619,567.

The reaction may conveniently be carried out in a solvent at a temperature of from 50° to 200°C, preferably from 100° to 150°C.

Particularly suitable solvents are polar organic solvents, for example glycols and glycol ethers such as ethylene glycol or ethylene glycol monomethyl ether, dimethylformamide or N-methylpyrrolidone; also acetanhydride, if necessary with added alkali metal acetate, glacial acetic acid or mixture of solvents.

The following Examples illustrate the invention. Unless stated otherwise, parts and percentages referred to are by weight.

EXAMPLE 1

The dye of the formula:

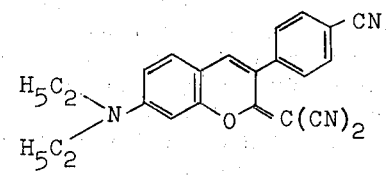

is obtained by boiling 4.75 parts of 3-(p-cyanophenyl)-7-diethyl-2-iminocoumarine and 0.99 part of malononitrile in 45 parts of glycol monoethyl ether for one hour under reflux, cooling to 5°C, and subjecting the precipitate to suction filtration followed by washing with 10 parts of methanol. The yield of yellow crystals is 4.5 parts. The melting point is 247°C.

EXAMPLE 2

The dye of the formula

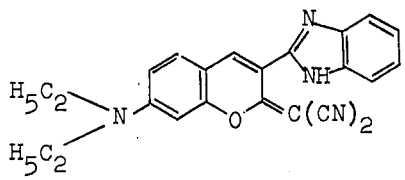

or its isomer of the formula

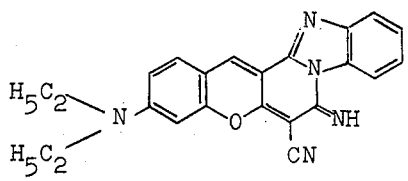

is obtained by boiling 5 parts of 3-benzimidazolyl(2')-7-diethylamino-2-iminocoumarine and 1 part of malononitrile in 45 parts of glycol monoethyl ether for ninety minutes under reflux, then cooling to 5°C and suction filtering the deposited crystals, washing them with 10 parts of methanol and drying them. The yield of dark red crystals is 3.2 parts and the melting point is 275°C.

EXAMPLE 3

The dye of the formula:

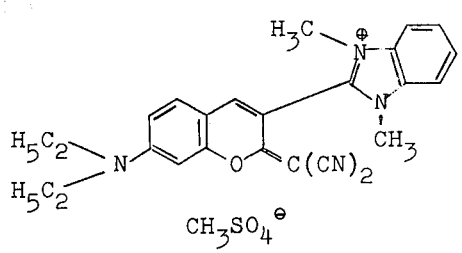

or its isomer of the probable formula:

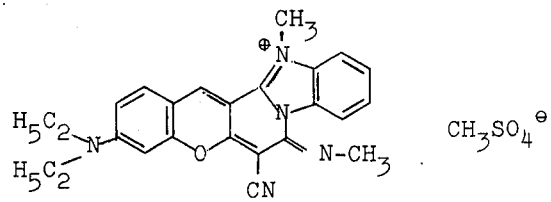

is obtained by heating 5.7 parts of the dye from Example 2, 2.52 parts of dimethyl sulfate and 130 parts of o-dichlorobenzene for 1 hour at 120°C, then cooling to 20°C, suction filtering the precipitate, washing it with petroleum ether and drying it.

The yield of black crystals having a melting point of 207° to 209°C is 6.5 parts.

EXAMPLE 4

The dye of the formula:

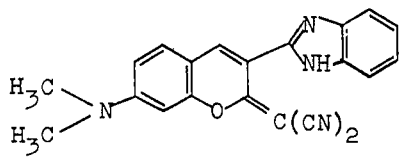

or its isomer of the formula

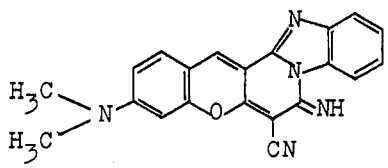

is obtained by following the procedure described in Example 2 but using 4.5 parts of 3-benzimidazolyl-(2')-7-dimethylamino-2-iminocoumarine instead of 3-benzimidazolyl-(2')-7-diethylamino-2-iminocoumarine.

The yield of red crystals is 5 parts and the compound melts at 270° to 272°C.

EXAMPLE 5

The dye of the formula:

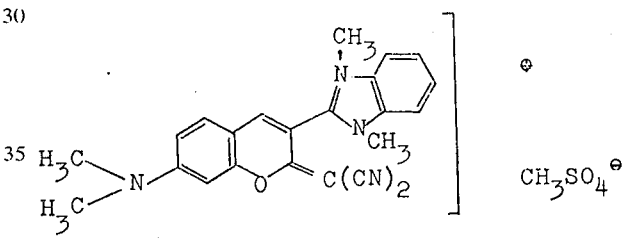

or its isomer of the probable formula

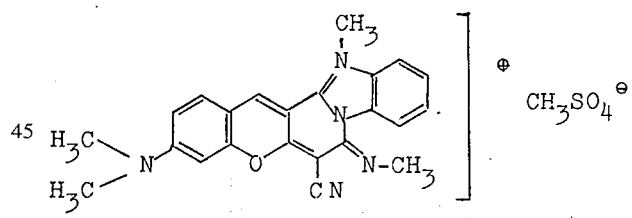

is obtained by heating 4.25 parts of the dye from Example 4 with 5.6 parts of dimethyl sulfate and 130 parts of o-dichlorobenzene for 3 hours at 120°C, then cooling to 0°C, suction filtering the precipitate, washing it with 10 parts of petroleum ether and drying it. 6 parts of black crystals are obtained having a melting point of 220° to 225°C.

EXAMPLE 6

The dye of the formula:

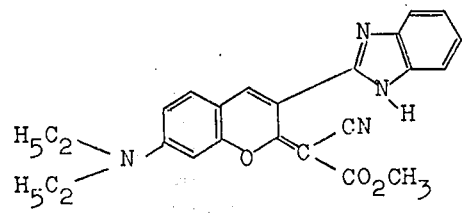

or the corresponding closed-ring product of the probable formula:

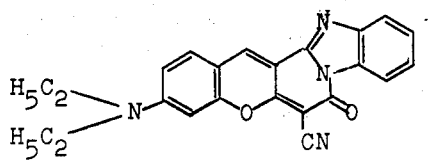

is obtained by boiling 4.98 parts of 3-benzimidazolyl-(2')-7-diethylamino-2-iminocoumarine and 1.47 parts of methyl cyanoacetate in 45 parts of glycol monoethyl ether for two hours thirty minutes under reflux, then cooling to 5°C, suction filtering the red crystals, washing them with 10 parts of alcohol and drying them. The yield is 1.2 parts and the melting point is 240°C.

EXAMPLE 7

The dye of the formula:

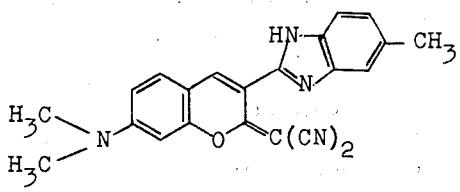

or its isomer of the formula:

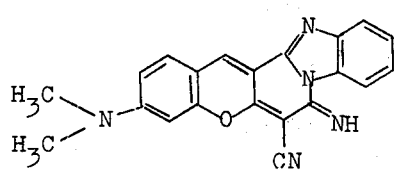

is obtained by boiling 3.18 parts of 3-(5'-methyl)-benzimidazolyl-(2')-7-dimethylamino-2-iminocoumarine and 0.66 parts of malononitrile in 45 parts of glycol monoethyl ether for one hour under reflux, then cooling to 5°C, suction filtering, washing with 10 parts of ethanol and drying. 3 parts of dark red crystals are obtained having a melting point of 312°C.

EXAMPLE 8

The dye of the formula:

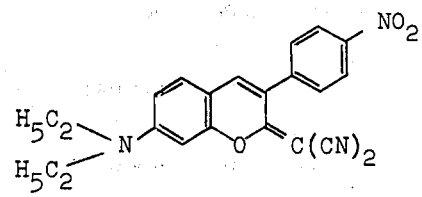

is obtained by boiling 3.1 parts of 3-(p-nitrophenyl)-7-diethylamino-2-iminocoumarine and 0.66 part of malononitrile in 45 parts of glycol monoethyl ether for 1 hour under reflux, then cooling to 5°C, suction filtering the deposited substance, washing it with 10 parts of ethanol and drying it. The yield of red crystals having a melting point of 296°C is 3 parts.

EXAMPLE 9

The dye of the formula:

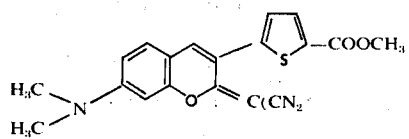

is obtained by boiling 3.28 parts of 3-(5'-carbomethoxy)-thenyl-(2')-7-dimethylamino-2-iminocoumarine and 0.66 part of malononitrile in 45 parts of glycol monoethyl ether for one hour under reflux, then cooling to 5°C followed by suction filtration and washing with 10 parts of methyl alcohol. After drying, 3 parts of red crystals having a melting point of 244° to 246°C are obtained.

In a manner analogous to that described in the Examples the dyes characterized in the following Table by their substituents are obtained:

| Ex. | $R^5$ | Y | R | Shade on polyester |
|---|---|---|---|---|
| 10 | $CH_3$ | $COOCH_3$ | -C6H4-CN | yellow |
| 11 | $C_2H_5$ | $COOC_2H_5$ | -C6H4-CN | yellow |
| 12 | $C_2H_5$ | $COOC_4H_9$ | -C6H4-CN | yellow |
| 13 | $C_2H_5$ | $CONH_2$ | -C6H4-CN | yellow |
| 14 | $C_2H_5$ | $CON(CH_3)_2$ | -C6H4-CN | yellow |
| 15 | $C_2H_5$ | $CONHC_6H_5$ | -C6H4-CN | yellow |
| 16 | $C_2H_5$ | CON(morpholino) | -C6H4-CN | yellow |

-Continued

| Ex. | R⁵ | Y | R | Shade on polyester |
|---|---|---|---|---|
| 17 | C₂H₅ | CN | -C₆H₄-CN | yellow |
| 18 | C₂H₅ | COOC₂H₅ | -C₆H₄-CN | yellow |
| 19 | C₂H₅ | COOC₂H₅ | -C₆H₄-NO₂ | yellow |
| 20 | C₂H₅ | CON(pyrrolidinyl) | -C₆H₄-NO₂ | yellow |
| 21 | C₂H₅ | CON(piperidinyl) | -C₆H₄-NO₂ | yellow |
| 22 | C₂H₅ | CN | -thienyl | orange yellow |
| 23 | C₂H₅ | CN | -thienyl-CONH₂ | orange yellow |
| 24 | C₂H₅ | CN | -thienyl-CN | orange yellow |
| 25 | C₂H₅ | CN | -thienyl-COOC₂H₅ | orange yellow |
| 26 | C₂H₅ | CN | -thienyl-COOC₄H₉ | orange yellow |
| 27 | C₂H₅ | CN | -thienyl-CON(N-CH₃-piperazinyl) | orange yellow |
| 28 | C₂H₅ | CN | -furyl | yellow |
| 29 | CH₃ | CN | -furyl-COOCH₃ | yellow |
| 30 | C₂H₅ | CN | -furyl-COOC₃H₉ | yellow |
| 31 | C₂H₅ | COOC₂H₅ | -furyl-COOC₄H₉ | yellow |
| 32 | C₂H₅ | CONHC₆H₅ | -furyl-COOCH₃ | yellow |
| 33 | C₂H₅ | COOC₂H₅ | -benzimidazolyl | red |
| 34 | C₂H₅ | COOC₄H₉ | -benzimidazolyl | red |
| 35 | C₂H₅ | COOC₃H₇ | -benzimidazolyl | red |
| 36 | C₂H₅ | CONHCH₃ | -benzimidazolyl | red |
| 37 | C₂H₅ | CON(C₂H₅)₂ | -benzimidazolyl | red |
| 38 | C₂H₅ | CON(C₄H₉)₂ | -benzimidazolyl | red |
| 39 | C₂H₅ | CON(CH₃)(C₄H₉) | -benzimidazolyl | red |
| 40 | C₂H₅ | CONHCH₂C₆H₅ | -benzimidazolyl | red |
| 41 | C₂H₅ | CN | -(methyl-benzimidazolyl) | red |

-Continued

| Ex. | R² | Y | R | Shade on polyester |
|---|---|---|---|---|
| 42 | C₂H₅ | COOC₂H₅ | benzimidazole-CH₃ (NH) | red |
| 43 | C₂H₅ | COOC₄H₉ | benzimidazole-CH₃ (NH) | red |
| 44 | C₂H₅ | CON(piperazine)NH | benzimidazole-CH₃ (NH) | red |
| 45 | C₂H₅ | CN | benzothiazole | orange |
| 46 | C₂H₅ | COOCH₃ | benzothiazole | orange |
| 47 | C₂H₅ | COOC₂H₅ | benzothiazole | orange |
| 48 | C₂H₅ | COOC₄H₉ | benzothiazole | orange |
| 49 | C₂H₅ | CON(morpholine)O | benzothiazole | orange |

Acrylonitrile polymers

| Ex. | R² | Y | R | Shade |
|---|---|---|---|---|
| 50 | C₂H₅ | CN | N,N-diethyl benzimidazolium | violet red |
| 51 | C₂H₅ | CN | N,N-bis(C₂H₄OH) benzimidazolium | violet red |
| 52 | C₂H₅ | CN | N,N-bis(CH₂CHOHCH₃) benzimidazolium | violet red |
| 53 | C₂H₅ | CN | N,N-dimethyl-methylbenzimidazolium | violet red |
| 54 | C₂H₅ | COOCH₃ | N,N-dimethyl-methylbenzimidazolium | violet red |
| 55 | C₂H₅ | COOC₄H₉ | N,N-dimethyl-methylbenzimidazolium | violet red |
| 56 | C₂H₅ | CN | N-methyl benzothiazolium | yellowish red |
| 57 | C₂H₅ | CN | N-ethyl benzothiazolium | yellowish red |

—Continued

| Ex. | R⁵ | Y | R | Shade on polyester |
|---|---|---|---|---|
| 58 | C₂H₅ | CN | 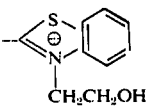 CH₂CH₂OH | yellowish red |
| 59 | C₂H₅ | COOC₂H₅ | 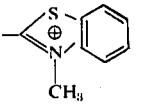 CH₃ | yellowish red |
| 60 | C₂H₅ | CN | 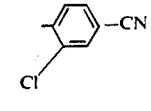 (Cl, —CN) | Polyester yellow |
| 61 | C₂H₅ | CN | 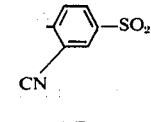 (CN, —SO₂NH₂) | yellow |
| 62 | C₂H₅ | CN | 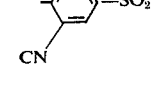 (CN, —SO₂CH₃) | yellow |
| 63 | C₂H₅ | CN | 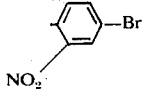 (NO₂, —Br) | yellow |
| 64 | C₂H₅ | CN | 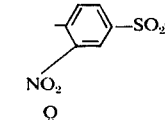 (NO₂, —SO₂C₂H₅) | yellow |
| 65 | C₂H₅ | CN | 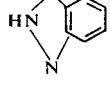 | red |

EXAMPLE 66

The dye of the formula:

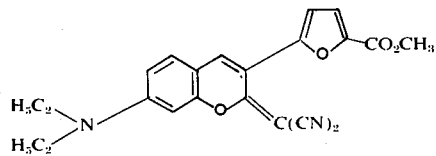

is obtained by stirring 4.8 parts of 3-(5'-carbomethoxy)-furyl-(2')-7-diethylamino-2-iminocoumarine and 0.93 part of malononitrile in 45 parts of glycol monoethyl ether for twenty minutes at 120°C, then cooling to 5°C, suction filtering, washing with 10 parts of methanol and drying. The yield is 1.5 parts and the melting point is 167° to 168°C.

EXAMPLE 67

The dye of the formula:

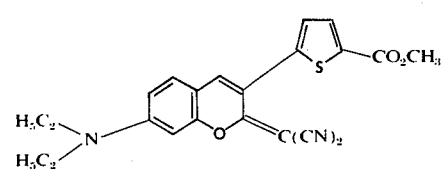

is obtained by stirring 7.1 parts of 3-(5'-carbomethoxy)-thenyl-(2')-7-diethylamino-2-iminocoumarine and 1.5 parts of malononitrile in 70 parts of glycol monoethyl ether for 1 hour at 135°C, then cooling to 5°C, suction filtering, washing with 10 parts of methanol and drying. The yield is 6.4 parts and the melting point is 218° to 220°C.

EXAMPLE 68

The dye of the formula:

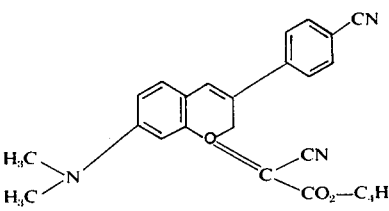

is obtained by stirring 5.7 parts of 3-p-cyanophenyl-7-dimethylamino-2-iminocoumarine and 30 parts of isobutyl cyanoacetate for 30 minutes at 150°C, then cooling to 5°C, suction filtering, washing with 10 parts of methanol and drying. The yield is 5.5 parts and the melting point is 227° to 228°C.

EXAMPLE 69

The dye of the formula:

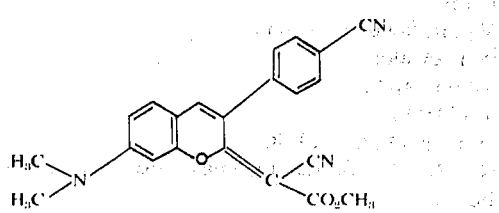

is obtained analogously to Example 68 from 5.7 parts of 3-p-cyanophenyl-7-dimethylamino-2-iminocoumarine and 30 parts of methyl cyanoacetate. The yield is 5.1 parts and the melting point is 268° to 270°C.

EXAMPLE 70

The dye of the formula:

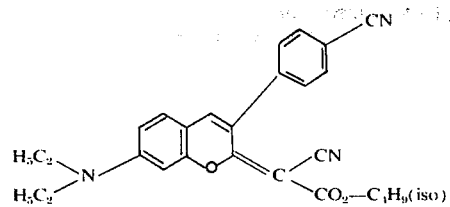

is obtained analogously to Example 68 from 6.3 parts of 3-p-cyanophenyl-7-diethylamino-2-iminocoumarine and 30 parts of isobutyl cyanoacetate. The yield is 4.9 parts and the melting point is 214° to 216°C.

EXAMPLE 71

The dye of the formula:

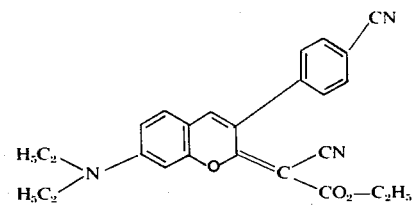

is obtained analogously to Example 68 from 6.3 parts of 3-p-cyanophenyl-7-diethylamino-2-iminocoumarine and 30 parts of ethyl cyanoacetate. The yield is 2.4 parts and the melting point is 200° to 202°C.

EXAMPLE 72

The dye of the formula:

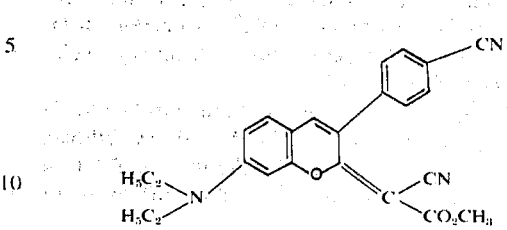

is obtained analogously to Example 68 from 6.3 parts of 3-p-cyanophenyl-7-diethylamino-2-iminocoumarine and 30 parts of methyl cyanoacetate. The yield is 5 parts and the melting point is 248° to 250°C.

EXAMPLE 73

Treatment of the dye of Example 2 with concentrated sulfuric acid:

6.5 parts of the dye from Example 2 is introduced with stirring at about 20°C into 28 parts of 98% sulfuric acid and stirred for 4 hours at 20°C. The solution is then poured slowly into a mixture of 1000 parts of water and 1000 parts of ice. 500 parts of saturated common salt solution is then added and the precipitated substance is suction filtered, the filter cake, while still moist, is suspended in 1000 parts of water and while stirring at about 20°C the pH is adjusted with caustic soda solution to 7.5. After stirring for twelve hours the deposited substance is suction filtered, washed with 1000 parts of water and dried. 6.4 parts of dye having a melting point of 264° to 266°C is obtained.

EXAMPLE 74

10 parts of 2-imino-3-(3',4'-dihydro-4'-oxoquinazolin-yl-2')-7-diethylaminocoumarine is heated in 80 parts of ethyl cyanoacetate for 1 hour at 80°C and 3 hours at 120°C. After cooling, the dye is suction filtered, washed with methanol and dried. 7 parts of the dye of the formula:

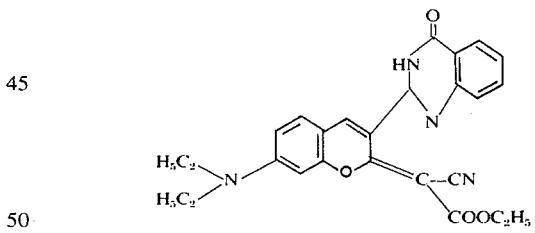

is obtained. It has a melting point of 210° to 212°C.

The dyes in which $R^5$ is methyl have very similar properties; the shade of the dyeings shows a hypsochromic shift.

We claim:

1. A fluorescent dye of the formula

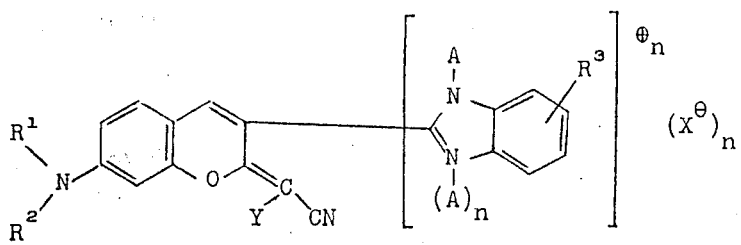

wherein:
- $R^1$ is hydrogen; alkyl of one to four carbon atoms which may bear methoxy, ethoxy, chlorine, bromine, carboxyl, carbalkoxy of 1 to 4 carbon atoms in the alkoxy portion, carbamoyl or acetoxy; cyclohexyl, benzyl or phenyl;
- $R^2$ is hydrogen; alkyl of one to four carbon atoms which may bear as a substituent methoxy, ethoxy, chlorine, bromine, carboxyl, carbalkoxy of 1 to 4 carbon atoms in the alkoxy portion, carbamoyl or acetoxy;
- Y is carbalkoxy of 1 to 4 carbon atoms in the alkoxy portion; unsubstituted carbamoyl; N-alkyl- or N,N-dialkylcarbamoyl of a total of up to 8 carbon atoms in the alkyl portions; phenylcarbamoyl; cyclohexylcarbamoyl; benzylcarbamoyl; or cyano;
- A is hydrogen, methyl, ethyl, β-hydroxyethyl or β-hydroxypropyl;
- $R^3$ is hydrogen or methyl;
- $n$ is zero or 1; and
- $X^-$ is an anion.

2. The dye of the formula as claimed in claim 1 wherein:
- $R_1$ and $R_2$ each is ethyl;
- Y is cyano;
- A is hydrogen; and
- $n$ is zero.

3. The dye of the formula as claimed in claim 1 wherein:
- $R_1$ and $R_2$ each is ethyl;
- Y is cyano;
- A is methyl;
- $n$ is 1; and
- X is the anion $CH_3SO_4^-$.

4. The dye of the formula as claimed in claim 1 wherein:
- $R_1$ and $R_2$ each is ethyl;
- Y is $-CO_2CH_3$;
- A is hydrogen; and
- $n$ is zero.

5. The dye of the formula as claimed in claim 1 wherein $R^1$ and $R^2$ each is alkyl of 1 to 4 carbon atoms.

6. The dye of the formula as claimed in claim 1 wherein $R^1$ and $R^2$ each is methyl or ethyl.

7. The dye of the formula as claimed in claim 1 wherein $n$ is zero.

8. The dye of the formula as claimed in claim 1 wherein Y is cyano.

9. The dye of the formula as claimed in claim 1 wherein Y is carbamoyl.

* * * * *

UNITED STATES PATENT AND TRADEMARK OFFICE
CERTIFICATE OF CORRECTION

PATENT NO. : 3,904,642
DATED : September 9, 1975
INVENTOR(S) : MACH et al

It is certified that error appears in the above-identified patent and that said Letters Patent are hereby corrected as shown below:

In Column 1, Line 47, delete " $X^-$ " and substitute -- $X^{\ominus}$ --

In Column 2, Line 5, delete " y " and substitute -- Y --

In Column 2, Line 6, delete " $X^-$ " and substitute -- $X^{\ominus}$ --

In Column 7, the structure in the column heading under R for examples 17 and 18 should be -- 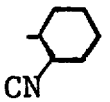 --

In Column 15, Line 22, delete " $X^-$ " and substitute -- $X^{\ominus}$ --

In Column 16, Line 9, delete " $CH_3SO_4^-$ " and substitute -- $CH_3SO_4^{\ominus}$ --

Signed and Sealed this

Seventh Day of September 1976

[SEAL]

Attest:

RUTH C. MASON
*Attesting Officer*

C. MARSHALL DANN
*Commissioner of Patents and Trademarks*